July 15, 1958  S. SENDEROFF ET AL  2,843,541
ELECTROPHORETIC DEPOSITION OF BARIUM TITANATE
Filed May 17, 1956
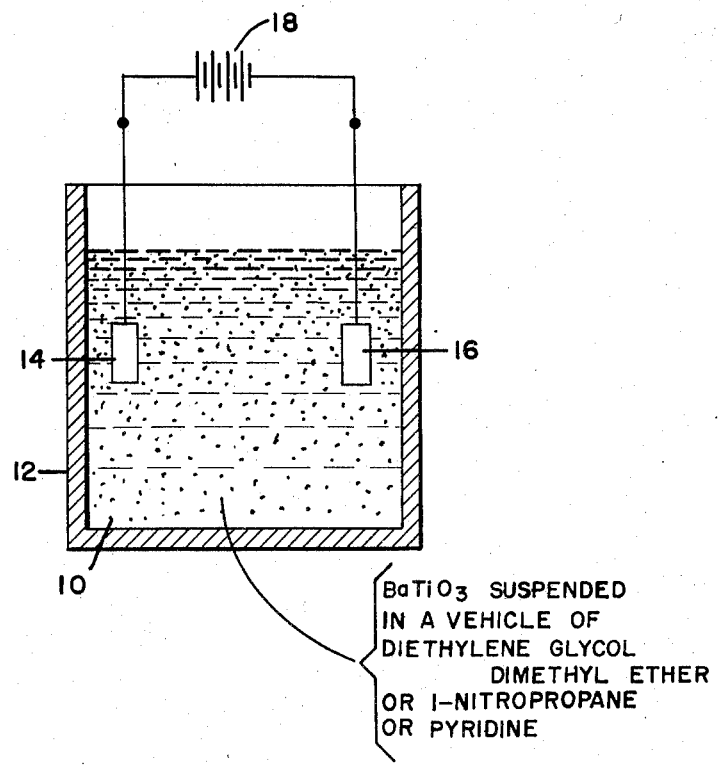
*INVENTOR.*
Seymour Senderoff
Walter E. Reid, Jr.
BY

United States Patent Office 2,843,541
Patented July 15, 1958

2,843,541

ELECTROPHORETIC DEPOSITION OF BARIUM TITANATE

Seymour Senderoff, Rocky River, Ohio, and Walter E. Reid, Jr., Washington, D. C.

Application May 17, 1956, Serial No. 585,593

9 Claims. (Cl. 204—181)

(Granted under Title 35, U. S. Code (1952), sec. 266)

The invention described herein may be manufactured and used by or for the Government for governmental purposes without payment to us of any royalty thereon.

This invention relates to piezoelectric units and more particularly to coating of barium titanate less than 0.010 inch thick on a metal sheet.

Barium titanate is a ceramic widely used as a piezoelectric material and has valuable dielectric properties. Its use has been limited as a dielectric material in capacitors with high capacity partially because of the difficulty in commercially producing bodies extremely thin (less than 0.005 inch) for this purpose. Also as a piezoelectric element it is often desirable that these units be other than flat, hence a coating on a metal is desirable. Many previous attempts of forming a thin coating of barium titanate on a metal object have been made.

We have invented a unit comprising a thin coating of barium titanate on a metal sheet and a method of producing it by electrophoresis.

An object of this invention is to produce a thin coating of barium titanate on a metal strip.

Other objects are to provide a cheap and easy method of manufacture.

The specific nature of the invention as well as other objects, uses, and advantages thereof will clearly appear from the following description and from the accompanying drawing, which is a schematic sectional view of the apparatus used in electrophoresis according to this invention.

In producing ceramic coatings in accordance with this invention the ceramic material is ground to a mean particle size of approximately 1 micron. It is then suspended in a suitable vehicle for electrophoresis.

In order to promote the deposition of a dense coating a vehicle is chosen such that electrolytic processes which may coagulate the dispersion in the neighborhood of the electrode are either absent or negligible. Such a vehicle must (1) be itself inert to electrolytic decomposition at the electrode and must (2) have sufficiently low ionizing power to keep the concentration of ionic solutes at a value no higher than is required to maintain stability of the colloidal dispersion.

In general, highly polar materials, or materials such as water, alcohols, ketones, etc., with active functional groups, fail to meet both requirements; and non-polar materials, such as hydrocarbons, fail to maintain sufficiently high ionic concentrations to stabilize the colloid.

Three vehicles which have been used with good success are: diethylene glycol dimethyl ether, 1-nitropropane, and pyridine. A potential of 500 to 2000 volts is maintained for one or two minutes. Neither the voltage nor the time is critical.

The apparatus used for electrophoresis is shown in the drawing. The suspension 10 of barium titanate in the vehicle is in container 12. Two electrodes 14 and 16, one of which is a sheet or other metal object, depend into the suspension and are connected to either terminal of direct current power source 18.

The following are specific examples of methods for depositing barium titanate:

Example A

One gram $BaTiO_3$, 100 mg. of an anionic detergent such as Penetrol-60 (a trade name of Beacon Company for a sodium or potassium salt of a sulfonated ester of a dicarboxylic acid) and 10 ml. diethylene glycol dimethyl ether are ground together for 18 hours. Then 65 ml. of diethylene glycol dimethyl ether are added to the resultant paste, and grinding is continued for another two hours. The resultant colloidal dispersion is removed from the mill and used for deposition. With a metal screen cathode and a metal sheet anode, deposits approximately 0.004 inch thick are obtained on the anode in about one minute at applied voltages between 500 and 2000 volts.

Example B

One gram $BaTiO_3$, 100 mg. ethyl cellulose, and 10 ml. pyridine are ground as in Example A, diluted with 90 ml. of pyridine and reground as in Example A. In this dispersion, with a metal screen anode and metal sheet cathode, deposits approximately 0.002 inch thick are obtained at the cathode in about one minute at applied voltages between 500 and 2000 volts.

Example C

One gram $BaTiO_3$ and 10 ml. 1-nitropropane are ground as in Example A, diluted with 50 ml. of 1-nitropropane and reground as in Example A. In this dispersion, with a metal screen anode and a metal sheet cathode, deposits approximately 0.005 inch thick are obtained at the cathode in about one minute at applied voltages between 500 and 2000 volts.

The coated sheets are air dried and then fired for three to five minutes at a temperature above 700° C. The preferred temperature is about 1200° C. but the actual temperature may be limited by the melting point of the metal strip. After firing the barium titanate remains as a dense tightly adherent layer bonded on the metal base. A silver electrode may be applied and the unit polarized in a conventional manner.

It will be apparent that the embodiments shown are only exemplary and that various modifications can be made in construction, materials and arrangement within the scope of the invention as defined in the appended claims.

We claim:

1. The method of coating metal objects with barium titanate comprising: mixing finely ground barium titanate with a vehicle selected from the group consisting of diethylene glycol dimethyl ether, 1-nitropropane, and pyridine, and then coating a metal object with the barium titanate by electrophoresis.

2. The method of coating metal objects with barium titanate comprising: mixing finely ground barium titanate with diethylene glycol dimethyl ether and then coating a metal object with the barium titanate by electrophoresis.

3. The method of coating metal objects with barium titanate comprising: mixing finely ground barium titanate with 1-nitropropane and then coating a metal object with the barium titanate by electrophoresis.

4. The method of coating metal objects with barium titanate comprising: mixing finely ground barium titanate with pyridine and then coating a metal object with the barium titanate by electrophoresis.

5. The method of coating metal objects with barium titanate comprising: finely grinding and mixing barium titanate with diethylene glycol dimethyl ether and an anionic detergent in the ratio of one gram of barium titanate to 100 milligrams of the detergent to 75 milliliters of the ether, then depending two metal electrodes into the resultant suspension, applying a direct current potential to the electrodes, removing the electrode which will have a coating of barium titanate on it, air drying this electrode, and then firing this electrode at a temperature above 700° C.

6. An electrophoretic bath for coating metal objects with barium titanate comprising: finely ground barium titanate particles, and a vehicle mixed with said particles to form a colloidal dispersion, said vehicle being selected from a group consisting of diethylene glycol dimethyl ether, 1-nitropropane, and pyridine.

7. An electrophoretic bath for coating metal objects with barium titanate, comprising: finely ground barium titanate particles, and diethylene glycol dimethyl ether mixed with said particles to form a colloidal dispersion.

8. An electrophoretic bath for coating metal objects with barium titanate, comprising: finely ground barium titanate particles, and 1-nitropropane mixed with said particles to form a colloidal dispersion.

9. An electrophoretic bath for coating metal objects with barium titanate, comprising: finely ground barium titanate particles, and pyridine mixed with said particles to form a colloidal dispersion.

References Cited in the file of this patent

UNITED STATES PATENTS

| | | |
|---|---|---|
| 2,426,609 | Hodgdon | Sept. 2, 1947 |
| 2,442,864 | Schneider | June 8, 1948 |
| 2,462,125 | Oakes | Feb. 22, 1949 |
| 2,495,630 | Dorst | Jan. 24, 1950 |
| 2,536,673 | Widell | June 2, 1951 |
| 2,746,888 | Ross | May 22, 1956 |
| 2,757,309 | Katzberg | July 31, 1956 |

FOREIGN PATENTS

| | | |
|---|---|---|
| 325,317 | Great Britain | Feb. 20, 1930 |
| 850,202 | Germany | Sept. 22, 1952 |